(12) United States Patent
Sun et al.

(10) Patent No.: US 10,133,398 B2
(45) Date of Patent: Nov. 20, 2018

(54) ARRAY SUBSTRATE, TOUCH DISPLAY DEVICE AND METHOD FOR DRIVING THE SAME

(71) Applicants: Xiamen Tianma Micro-Electronics Co., Ltd., Xiamen (CN); Tianma Micro-Electronics Co., Ltd., Shenzhen (CN)

(72) Inventors: Ying Sun, Xiamen (CN); Yumin Xu, Xiamen (CN)

(73) Assignees: Xiamen Tianma Micro-Electronics Co., Ltd., Xiamen (CN); Tianma Micro-Electronics Co., Ltd., Shenzhen (CN)

( * ) Notice: Subject to any disclaimer, the term of this patent is extended or adjusted under 35 U.S.C. 154(b) by 217 days.

(21) Appl. No.: 15/159,767

(22) Filed: May 19, 2016

(65) Prior Publication Data

US 2017/0115802 A1 Apr. 27, 2017

(30) Foreign Application Priority Data

Oct. 22, 2015 (CN) .......................... 2015 1 0688287

(51) Int. Cl.
*G06F 3/041* (2006.01)
*G09G 3/36* (2006.01)
(Continued)

(52) U.S. Cl.
CPC .......... *G06F 3/0416* (2013.01); *G02F 1/1368* (2013.01); *G02F 1/13338* (2013.01); *G02F 1/133308* (2013.01); *G02F 1/133514* (2013.01); *G02F 1/134309* (2013.01); *G02F 1/136286* (2013.01); *G06F 3/044* (2013.01);
(Continued)

(58) Field of Classification Search
CPC ... G06F 3/0416; G06F 3/0412; G09G 3/3677; G09G 2310/0286; G09G 2300/0408; G09G 2354/00; G02F 1/133308; G02F 1/13338; G02F 1/133514; G02F 1/134309; G02F 1/1368; G02F 1/136286
See application file for complete search history.

(56) References Cited

U.S. PATENT DOCUMENTS 4,982,183 A * 1/1991 Flegal ...................... G09G 3/30
315/169.3
2012/0044166 A1* 2/2012 Mizuhashi ............ G06F 3/0412
345/173
(Continued)

FOREIGN PATENT DOCUMENTS

CN 104461138 A 3/2015
CN 104485082 A 4/2015

*Primary Examiner* — Amr A Awad
*Assistant Examiner* — Wing Chow
(74) *Attorney, Agent, or Firm* — Kilpatrick Townsend & Stockton LLP (57) ABSTRACT

An array substrate, a touch display device and a driving method thereof are provided by the present disclosure. The array substrate includes a gate driving circuit and a touch driving circuit provided in a non-display area. The touch driving circuit includes multiple groups of touch selective output modules. Every group of touch selective output module includes two strobe signal input terminals for which the strobe signals are provided by secondary trigger signal output terminals of two adjacent shift registers in the gate driving circuit.

13 Claims, 8 Drawing Sheets

(51) Int. Cl.
*G02F 1/1333* (2006.01)
*G02F 1/1362* (2006.01)
*G02F 1/1343* (2006.01)
*G02F 1/1368* (2006.01)
*G02F 1/1335* (2006.01)
*G06F 3/044* (2006.01)

(52) U.S. Cl.
CPC ......... *G06F 3/0412* (2013.01); *G09G 3/3677* (2013.01); *G09G 2300/0408* (2013.01); *G09G 2310/0286* (2013.01); *G09G 2354/00* (2013.01)

(56) References Cited

U.S. PATENT DOCUMENTS

| | | | |
|---|---|---|---|
| 2012/0105396 A1* | 5/2012 | Sakamoto | G09G 3/3677 345/204 |
| 2014/0253498 A1* | 9/2014 | Suzuki | G06F 3/044 345/174 |
| 2015/0268777 A1* | 9/2015 | Okamura | G06F 3/0412 345/205 |

* cited by examiner

Fig. 1

(Prior Art)

ARRAY SUBSTRATE, TOUCH DISPLAY DEVICE AND METHOD FOR DRIVING THE SAME

CROSS-REFERENCE TO RELATED APPLICATIONS

This application is based upon and claims priority to Chinese Patent Application 201510688287.6, filed Oct. 22, 2015, the entire contents of which are incorporated herein by reference.

TECHNICAL FIELD

The present disclosure generally relates to fields of touch display technology, and more particularly, to an array substrate, a touch display device with the array substrate and a driving method thereof.

BACKGROUND

In a typical HIC (Hybrid In-Cell) touch display screen, a touch sensing electrode (RX) is usually provided at one side of a CF (Color Filter) away from a liquid crystal layer while a common electrode (Common) at inner side of a TFT array substrate is partitioned into several pieces serving as touch driving electrodes (TXs). For avoiding mutual interference between display driving and touch driving, each TX signal output is at level of VCOM during time of displaying, and, during time of touch scanning, N pulse signals are output by every group of TX electrode and a TX signal is output once every N rows, where N depends on the number of gate lines and that of TX electrodes.

Figure 1:
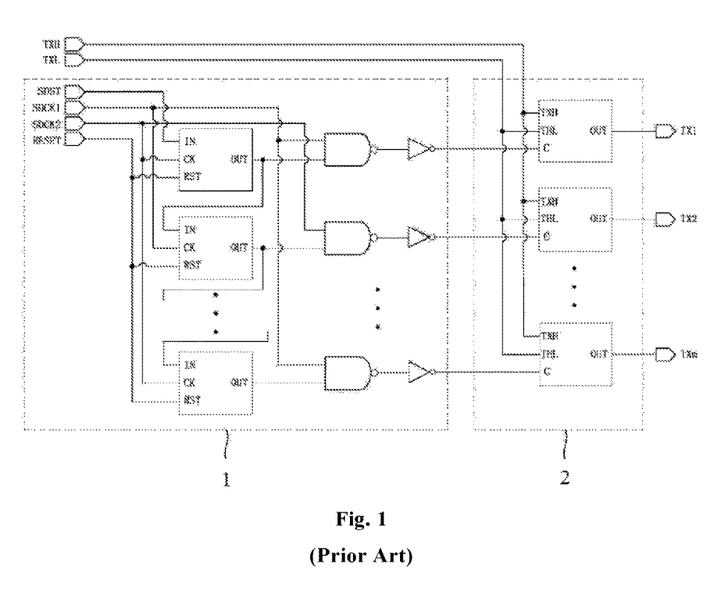
FIG. 1 is block diagram illustrating a conventional touch driving circuit.

FIG. 1 is a block diagram illustrating a conventional touch driving circuit. As shown in FIG. 1, the driving circuit includes a scanning module 1 and a touch selective output module 2. Herein, the scanning module 1 provides the touch selective output module 2 with a strobe signal such that the touch selective output module 2 can generate a touch driving signal accordingly. As can be seen from FIG. 1, the conventional touch driving circuit is relatively complicated. When the conventional touch driving circuit is applied in a touch display electronic device, it will occupy a relatively large space at bezel area. Therefore, it is very difficult to implement the touch display device with a slim bezel, and the problem gets more serious especially for those handheld mobile devices (e.g., smart phones, tablet computers).

Moreover, as can be further seen from FIG. 1, there are relatively many signal input terminals (SDST, SDCK1, SDCK2, RESET, TXH and THL as shown in FIG. 1) in the driving circuit and thus there are relatively many controlling signals output by an IC (integrated circuit) for controlling them. This may raise the cost on the IC.

SUMMARY

The present disclosure is directed to provide an array substrate with a simple touch driving circuit, a touch display device and a driving method thereof, so as to achieve design of a slim bezel for a touch electronic device.

Other features and advantages of the disclosure may be apparent through detailed description hereinafter, or may be obtained through implementation thereof.

According to a first aspect the present disclosure, there is provided an array substrate including a display area and a non-display area located at least two opposite outer sides of the display area. Herein, the array substrate further includes:

N rows of scanning lines provided in the display area, where N is an integer greater than 1;

a gate driving circuit provided in the non-display area, including N groups of shift registers, wherein each group of the shift registers includes a trigger signal input terminal and a secondary trigger signal output terminal; the gate driving circuit includes a first gate driving circuit, a second gate driving circuit, a third gate driving circuit and a fourth gate driving circuit, wherein the first and third gate driving circuits are provided at one side of the non-display area and configured to respectively provide scanning signals to odd-numbered rows of the scanning lines, and respective groups of shift registers in the first and third gate driving circuits are alternatively arranged at intervals; the second and fourth gate driving circuits are provided at an opposite side of the non-display area and configured to respectively provide scanning signals to even-numbered rows of the scanning lines, and respective groups of shift registers in the second and fourth gate driving circuits are alternatively arranged at intervals; every shift register in one of the first, second, third and fourth gate driving circuits is coupled in series with another shift register in the one of the first, second, third and fourth gate driving circuits, and the trigger signal input terminal of a following group of shift register is coupled to the secondary trigger signal output terminal of a preceding group of shift register; and a touch driving circuit provided in the non-display area, including a first touch driving circuit and a second touch driving circuit; wherein the first touch driving circuit includes M1 groups of first touch selective output modules, each group of the first touch selective output modules includes a first strobe signal input terminal and a second strobe signal input terminal; and the second touch driving circuit includes M2 groups of second touch selective output modules, each group of the second touch selective output modules includes a third strobe signal input terminal and a fourth strobe signal input terminal, where both M1 and M2 are integers greater than 1; the first and second strobe signal input terminals in respective group of first touch selective output module are respectively coupled to the secondary trigger signal output terminals of two adjacent shift registers in the first and third gate driving circuits correspondingly, and the third and fourth strobe signal input terminals in respective group of second touch selective output module are respectively coupled to the secondary trigger signal output terminals of two adjacent shift registers in the second and fourth gate driving circuits correspondingly.

According to a second aspect the present disclosure, there is provided a touch display device, including: the array substrate as described above; a color filter provided in opposite to the array substrate; and a liquid crystal layer sandwiched between the array substrate and the color filter.

According to a third aspect the present disclosure, there is provided a method for driving a touch display device, wherein the touch display device includes: a plurality of first shift register sets, a plurality of second shift register sets, a plurality of third shift register sets, a plurality of fourth shift register sets, multiple groups of a first touch selective output module and multiple groups of a second touch selective output module; every one of the first, second, third and fourth shift register sets respectively includes at least one group of shift register, every group of shift register in respective shift register set generates a scanning signal for scanning one row of scanning line and a secondary trigger signal for driving a following group of shift register in corresponding shift register set; every shift register in the first and third shift register sets is configured to respectively provide scanning signal to an odd-numbered row of scanning line, and respective groups of shift register in the first and third shift register sets are alternatively arranged at intervals; every shift register in the second and fourth shift register sets is configured to respectively provide scanning signal to an even-numbered row of scanning line, and respective groups of shift register in the second and fourth shift register sets are alternatively arranged at intervals; every group of the first touch selective output module includes a first strobe signal input end and a second strobe signal input end, the first strobe signal input end is coupled with a secondary trigger signal output end of a last one shift register of a corresponding first shift register set, and the second strobe signal input end is coupled with a secondary trigger signal output end of a last one shift register of a corresponding third shift register set; every group of the second touch selective output module includes a third strobe signal input end and a fourth strobe signal input end, the third strobe signal input end is coupled with a secondary trigger signal output end of a last one shift register of a corresponding second shift register set, and the fourth strobe signal input end is coupled with a secondary trigger signal output end of a last one shift register of a corresponding fourth shift register set. The method includes: scanning, by respective shift register in every one of the first shift register sets and respective shift register in every one of the second shift register sets, a correspondingly coupled scanning line in a staggered way during a first half frame of display scanning; driving, with a secondary trigger signal respectively generated by a last one shift register in every one of the first shift register sets and a last one shift register in every one of the second shift register sets, the first touch selective output module and the second touch selective output module after completion of the scanning for the correspondingly coupled scanning line by the respective shift register in every one of the first and second shift register sets, such that a first touch driving signal is provided to one of the touch driving electrodes simultaneously; scanning, by respective shift register in every one of the third shift register sets and respective shift register in every one of the fourth shift register sets, a correspondingly coupled scanning line in a staggered way during a second half frame of the display scanning; and driving, with a secondary trigger signal respectively generated by a last one shift register in every one of the third shift register sets and a last one shift register in every one of the fourth shift register sets, the first touch selective output module and the second touch selective output module after completion of the scanning for the correspondingly coupled scanning line by the respective shift register in every one of the third and fourth shift register sets, such that a second touch driving signal is provided to one of the touch driving electrodes simultaneously.

According to the array substrate, the touch display device and the driving method thereof provided by the present disclosure, a simplified touch driving circuit is provided, such that it is easy to achieve design of a slim bezel, and the number of signal input terminals as well as cost on ICs can be reduced. Furthermore, the scanning of all of the touch driving electrodes can be completed for once in each half frame, such that it can be achieved a report frequency as twice as the frame rate. Moreover, touch signal can be provided for a single strip of touch driving electrode from both sides by two groups of touch selective output modules at the same time, such that attenuation of the driving signal at one side caused by providing the driving signal from only the other side can be avoided, and strength of the driving signal can be improved.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

Features and advantages of the present disclosure described above as well as other features and advantages thereof may become more apparent through detailed description of exemplary embodiments by reference to the accompanying drawings.

DETAILED DESCRIPTION

Description will now be made in detail to exemplary embodiments by reference to the accompanying drawings. However, the exemplary embodiments may be implemented in various ways rather than being understood as limited to those embodiments described herein. Instead, those embodiments are provided to illustrate the disclosure comprehensively and completely, and to deliver concept of the exemplary embodiments entirely to those skilled in the art. Like elements are represented by like reference signs in the drawings, and detailed description thereof may be omitted.

Furthermore, features, structures or properties described herein may be combined into one or more embodiments in any proper ways. Detailed description will be made hereinafter to enable the embodiments of the disclosure to be comprehensible. However, it should be noted for those skilled in the art, technical solution of the disclosure may be implemented by means of alternative structures, materials or processes instead of one or more of those specific elements described herein. Otherwise, structures, processes or operations well known in the art may be not illustrated or described herein for fear of obscuring aspects of the disclosure.

Figure 2:
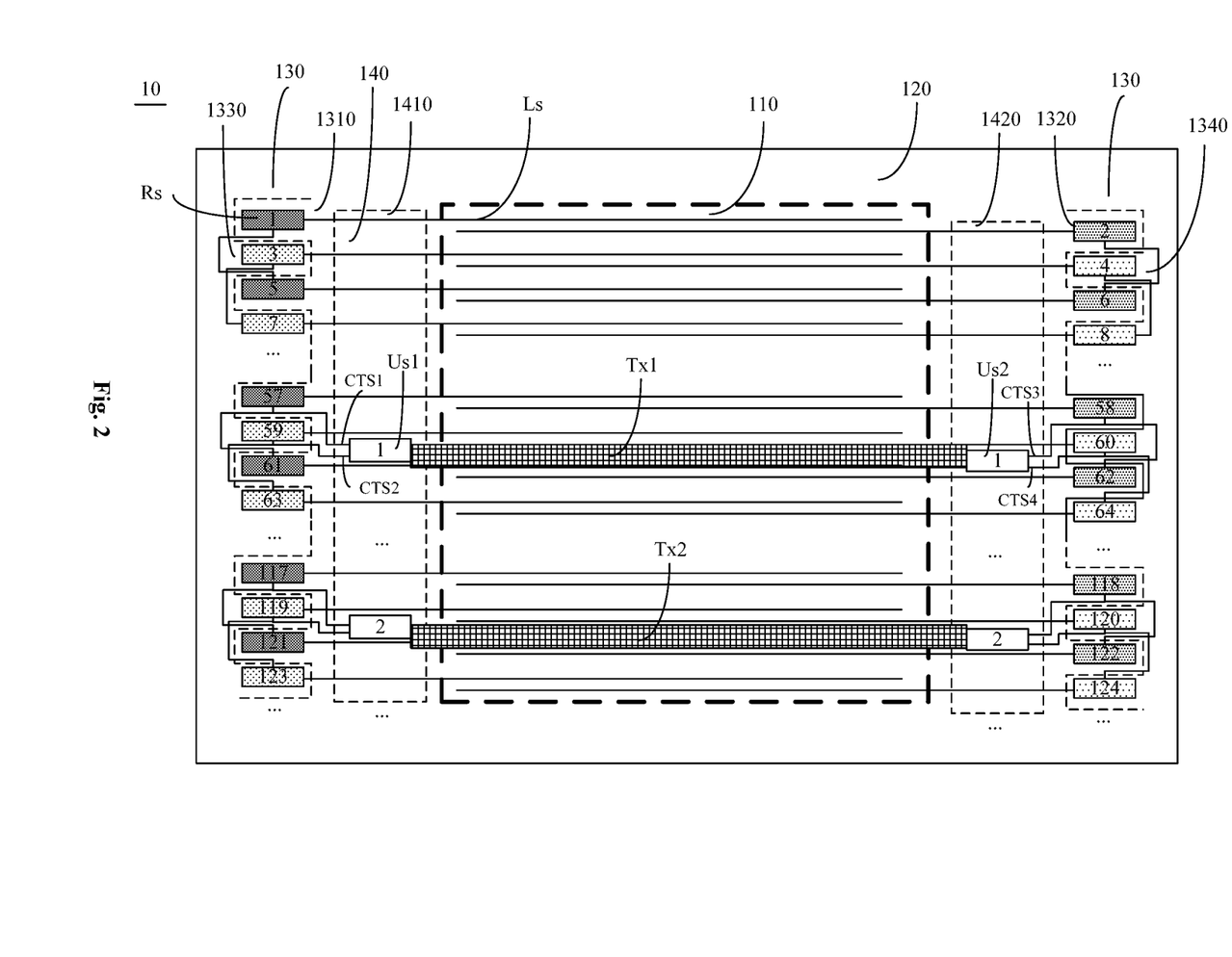
FIG. 2 is block diagram illustrating an array substrate according to an embodiment of the disclosure.

FIG. 2 is block diagram illustrating an array substrate according to an embodiment of the disclosure. As shown in FIG. 2, the array substrate 10 includes a display area 110 and a non-display area 120. In an embodiment, the non-display area 120 is located at at least two opposite outer sides of the display area 110, for example, located at left and right outer sides of the display area 110, or, as shown in the drawing, located around the display area 110.

Moreover, the array substrate 10 further includes N rows of scanning lines Ls, a gate driving circuit 130 and a touch driving circuit 140. In an embodiment, the N rows of scanning lines Ls are provided in the display area 110, where N is an integer greater than 1;

The gate driving circuit 130 is provided in the non-display area 120 and includes N groups of shift registers Rs. In an embodiment, each group of the shift registers Rs includes a trigger signal input terminal and a secondary trigger signal output terminal. The gate driving circuit 130 can be divided into a first gate driving circuit 1310, a second gate driving circuit 1320, a third gate driving circuit 1330 and a fourth gate driving circuit 1340.

In an embodiment, the first gate driving circuit 1310 and the third gate driving circuit 1330 are provided at one side of the non-display area 120. Shift registers Rs in the first gate driving circuit 1310 and the third gate driving circuit 1330 are alternatively arranged at intervals and configured to respectively provide scanning signals to odd-numbered rows of the scanning lines Ls. For example, as shown in FIG. 2, the first gate driving circuit 1310 includes the $1^{st}$, $5^{th}$, ... $117^{th}$ and $121^{st}$ groups of shift registers Rs, and the third gate driving circuit 1330 includes the $3^{rd}$ $7^{th}$ ... $119^{th}$ and $123^{rd}$ groups of shift registers Rs. Groups of shift registers Rs in each of the first gate driving circuit 1310 and the third gate driving circuit 1330 are connected in series, and the trigger signal input terminal of a group of shift register Rs is coupled to the secondary trigger signal output terminal of a group of shift register Rs preceding to the former group of shift register Rs). For example, as shown in FIG. 2, the secondary trigger signal output terminal of the $1^{st}$ group of shift register Rs in the first gate driving circuit 1310 is coupled to the trigger signal input terminal of the $5^{th}$ group of shift register Rs, the secondary trigger signal output terminal of the $5^{th}$ group of shift register Rs is coupled to the trigger signal input terminal of the $9^{th}$ group of shift register Rs (not shown), and so on. Likewise, the secondary trigger signal output terminal of the $3^{rd}$ group of shift register Rs in the third gate driving circuit 1330 is coupled to the trigger signal input terminal of the $7^{th}$ group of shift register Rs, the secondary trigger signal output terminal of the $7^{th}$ group of shift register Rs is coupled to the trigger signal input terminal of the $11^{th}$ group of shift register Rs (not shown), and so on.

The second gate driving circuit 1320 and the fourth gate driving circuit 1340 are provided at the other opposite side of the non-display area 120. Shift registers Rs in the second gate driving circuit 1320 and the fourth gate driving circuit 1340 are alternatively arranged at intervals and configured to respectively provide scanning signals to even-numbered rows of the scanning lines Ls. As shown in FIG. 2, for example, the second gate driving circuit 1320 includes the $2^{nd}$, $6^{th}$, ... $118^{th}$ and $122^{nd}$ groups of shift registers Rs, and the fourth gate driving circuit 1340 includes the $4^{th}$, $8^{th}$ ... $120^{th}$ and $124^{th}$ groups of shift registers Rs. Groups of shift register Rs in each of the second gate driving circuit 1320 and the fourth gate driving circuit 1340 are connected in series. The trigger signal input terminal of a group of shift register Rs is coupled to the secondary trigger signal output terminal of a group of shift register Rs preceding to the former group of shift register Rs. As shown in FIG. 2, for example, the secondary trigger signal output terminal of the $2^{nd}$ group of shift register Rs in the second gate driving circuit 1320 is coupled to the trigger signal input terminal of the $6^{th}$ group of shift register Rs, the secondary trigger signal output terminal of the $6^{th}$ group of shift register Rs is coupled to the trigger signal input terminal of the $10^{th}$ group of shift register Rs (not shown), and so on. Likewise, the secondary trigger signal output terminal of the $4^{th}$ group of shift register Rs in the fourth gate driving circuit 1340 is coupled to the trigger signal input terminal of the $8^{th}$ group of shift register Rs, the secondary trigger signal output terminal of the $8^{th}$ group of shift register Rs is coupled to the trigger signal input terminal of the $12^{th}$ group of shift register Rs (not shown), and so on.

The touch driving circuit 140 is also provided in the non-display area 120 and includes a first touch driving circuit 1410 and a second touch driving circuit 1420. In an embodiment, the first touch driving circuit 1410 is located at one side of the non-display area 120, for example, the side thereof where the first gate driving circuit 1310 and the third gate driving circuit 1330 are located. The first touch driving circuit 1410 in that example is closer to the display area 110 than the first gate driving circuit 1310 and the third gate driving circuit 1330. In other words, the first touch driving circuit 1410 is sandwiched between the first, third gate driving circuits 1310, 1330 and the display area 110. In an embodiment, the second touch driving circuit 1420 is located at the other opposite side of the non-display area 120, for example, the side thereof where the second gate driving circuit 1320 and the fourth gate driving circuit 1340 are located. The second touch driving circuit 1420 in that example is closer to the display area 110 than the second gate driving circuit 1320 and the fourth gate driving circuit 1340. In other words, the second touch driving circuit 1420 is sandwiched between the second, fourth gate driving circuits 1320, 1340 and the display area 110.

The first touch driving circuit 1410 includes M1 groups of first touch selective output module Us1. Each group of the first touch selective output modules Us1 includes a first strobe signal input terminal CTS1 and a second strobe signal input terminal CTS2. The second touch driving circuit 1420 includes M2 groups of second touch selective output modules Us2. Each group of the second touch selective output modules Us2 includes a third strobe signal input terminal CTS3 and a fourth strobe signal input terminal CTS4. In an embodiment, both M1 and M2 are integers greater than 1.

The first strobe signal input terminal CTS1 and the second strobe signal input terminal CTS2 in respective group of the first touch selective output modules Us1 are respectively coupled to the secondary trigger signal output terminals of two adjacent shift registers in the first gate driving circuit 1310 and the third gate driving circuit 1330 correspondingly. The third strobe signal input terminal CTS3 and the fourth strobe signal input terminal CTS4 in respective group of the second touch selective output modules Us2 are respectively coupled to the secondary trigger signal output terminals of two adjacent shift registers in the second gate driving circuit 1320 and the fourth gate driving circuit 1340 correspondingly.

In an embodiment, the first gate driving circuit 1310 and the third gate driving circuit 1330 respectively includes M1 shift register sets. The second gate driving circuit 1320 and the fourth gate driving circuit 1340 respectively includes M2 shift register sets. Each one of the shift register sets includes at least one group of shift register Rs. As shown in FIG. 2, for example, the first shift register set in the first gate driving circuit 1310 includes the $1^{st}$, $5^{th}$, ... $57^{th}$ groups of shift registers, and the second shift register set therein includes the $61^{st}$, $65^{th}$, ... $117^{th}$ groups of shift registers. The first shift register set in the third gate driving circuit 1330 includes the $3^{rd}$ $7^{th}$ ... $59^{th}$ groups of shift registers, and the second shift register set therein includes the $63^{rd}$, $67^{th}$, ... $119^{th}$ groups of shift registers; the first shift register set in the second gate driving circuit 1320 includes the $2^{nd}$, $6^{th}$, ... $58^{th}$ groups of shift registers, and the second shift register set therein includes the $62^{nd}$, $66^{th}$, ... $118^{th}$ groups of shift registers. the first shift register set in the fourth gate driving circuit 1340 includes the $4^{th}$, $8^{th}$, ... $60^{th}$ groups of shift registers, and the second shift register set includes the $64^{th}$, $68^{th}$, ... $120^{th}$ groups of shift registers.

In an embodiment, the first strobe signal input terminal CTS1 in every group of the first touch selective output module Us1 is coupled to the secondary trigger signal output terminal of one last shift register Rs of a corresponding shift register set in the first gate driving circuit 1310. As shown in FIG. 2, for example, the first strobe signal input terminal CTS1 in the $1^{st}$ group of first touch selective output module Us1 is coupled to the secondary trigger signal output terminal of the $57^{th}$ group of shift register Rs in the first shift register set of the first gate driving circuit 1310. The second strobe signal input terminal CTS2 in every group of first touch selective output module Us1 is coupled to the secondary trigger signal output terminal of one last shift register Rs of a corresponding shift register set in the third gate driving circuit 1330. As shown in FIG. 2, for example, the second strobe signal input terminal CTS2 in the $1^{st}$ group of first touch selective output module Us1 is coupled to the secondary trigger signal output terminal of the $59^{th}$ group of shift register Rs in the first shift register set of the third gate driving circuit 1330. The third strobe signal input terminal CTS3 in every group of the second touch selective output module Us2 is coupled to the secondary trigger signal output terminal of one last shift register Rs of a corresponding shift register set in the second gate driving circuit 1320. As shown in FIG. 2, for example, the third strobe signal input terminal CTS3 in the $1^{st}$ group of second touch selective output module Us2 is coupled to the secondary trigger signal output terminal of the $58^{th}$ group of shift register Rs in the first shift register set of the second gate driving circuit 1320. The fourth strobe signal input terminal CTS4 in every group of the second touch selective output module Us2 is coupled to the secondary trigger signal output terminal of one last shift register Rs of a corresponding shift register set in the fourth gate driving circuit 1340. As shown in FIG. 2, for example, the fourth strobe signal input terminal CTS4 in the $1^{st}$ group of second touch selective output module Us2 is coupled to the secondary trigger signal output terminal of the $60^{th}$ group of shift register Rs (the last one) in the first shift register set of the fourth gate driving circuit 1340.

Moreover, in the first touch driving circuit 1410 and the second touch driving circuit 1420, the first touch selective output module Us1 and the second touch selective output module Us2 of a same group are respectively arranged in symmetry with respective group of shift register Rs in the first, third gate driving circuit and in the second, fourth gate driving circuit.

As shown in FIG. 2, for example, the secondary trigger signal output terminal of the $57^{th}$ group of shift register Rs in the first gate driving circuit 1310 is coupled to the first strobe signal input terminal CTS1 of the $1^{st}$ group of first touch selective output module Us1 in the first touch driving circuit 1410. The secondary trigger signal output terminal of the $59^{th}$ group of shift register Rs in the third gate driving circuit 1330 is coupled to the second strobe signal input terminal CTS2 of the $1^{st}$ group of first touch selective output module Us1 in the first touch driving circuit 1410. The secondary trigger signal output terminal of the $58^{th}$ group of shift register Rs in the second gate driving circuit 1320 is coupled to the third strobe signal input terminal CTS3 of the $1^{st}$ group of second touch selective output module Us2 in the second touch driving circuit 1420. The secondary trigger signal output terminal of the $60^{th}$ group of shift register Rs in the fourth gate driving circuit 1340 is coupled to the fourth strobe signal input terminal CTS4 of the $1^{st}$ group of second touch selective output module Us2 in the second touch driving circuit 1420.

As further shown in FIG. 2, the secondary trigger signal output terminal of the $117^{th}$ group of shift register Rs in the first gate driving circuit 1310 is coupled to the first strobe signal input terminal CTS1 of the $2^{nd}$ group of first touch selective output module Us1 in the first touch driving circuit 1410. The secondary trigger signal output terminal of the $119^{th}$ group of shift register Rs in the third gate driving circuit 1330 is coupled to the second strobe signal input terminal CTS2 of the $2^{nd}$ group of first touch selective output module Us1 in the first touch driving circuit 1410. The secondary trigger signal output terminal of the $118^{th}$ group of shift register Rs in the second gate driving circuit 1320 is coupled to the third strobe signal input terminal CTS3 of the $2^{nd}$ group of second touch selective output module Us2 in the second touch driving circuit 1420. The secondary trigger signal output terminal of the $120^{th}$ group of shift register Rs in the fourth gate driving circuit 1340 is coupled to the fourth strobe signal input terminal CTS4 of the $2^{nd}$ group of second touch selective output module Us2 in the second touch driving circuit 1420.

It should be noted that, both the number of shift registers Rs between any two groups of the first touch selective output modules and the number of shift registers Rs between any two groups of the second touch selective output modules can be determined according to actual design and requirement instead of being limited by the disclosure. For example, either the number of shift registers Rs between any two groups of the first touch selective output modules or the number of shift registers Rs between any two groups of the second touch selective output modules can be set as equal or not equal to each other. Alternatively, the number of shift registers Rs in beginning and ending parts may be set as equal to each other, while the number of shift registers Rs between any two groups of the first or second touch selective output modules in middle part may be set as equal to one another. For example, there are a groups for the beginning and ending parts while b groups for the middle part, but the present disclosure is not limited thereto.

As shown in FIG. 2, the array substrate 10 further includes M3 touch driving electrodes Tx provided in the display area 110. When the number of groups of the first touch selective output modules is equal to the number of groups of the second touch selective output modules (M1=M2), M3 is equal to both M1 and M2. A touch driving electrode Tx is coupled to one corresponding group of the first touch selective output module Us1 and/or the second selective output module Us2. As shown in FIG. 2, for example, the first touch driving electrode Tx1 is coupled to the $1^{st}$ group of first touch selective output module Us1 and the $1^{st}$ group of second selective output module Us2. The second strip of touch driving electrode Tx2 is coupled to the $2^{nd}$ group of first touch selective output module Us1 and the $2^{nd}$ group of second selective output module Us2; and so on. When M1 is not equal to M2, M3 is equal to the maximum of M1 and M2. For example, when M1 is greater than M2, there are only (M3-M2) touch driving electrodes Tx coupled to (M1-M2) groups of first touch selective output modules Us1; when M2 is greater than M1, there are (M3-M1) touch driving electrodes Tx coupled to (M2-M1) groups of second touch selective output modules Us2. The number M3 of the touch driving electrodes Tx, is equal to the maximum of M1 and M2, so at least one of the first touch driving circuit 1410 and the second touch driving circuit 1420 can provide touch driving signals for all of the touch driving electrodes Tx, such that scanning of all of the touch driving electrodes Tx can be complete.

In some embodiments of the disclosure, the number of groups of first touch selective output modules Us1 is equal to the number of groups of second touch selective output modules Us2 (M1=M2). Thus, every touch driving electrode Tx is coupled to both of one group of first touch selective output module Us1 and one group of second selective output module Us2, such that driving signals can be provided for a single touch driving electrode from both sides by the first touch selective output module Us1 and the second selective output module Us2 during period of touch scanning. Accordingly, attenuation of the driving signal at one side caused by providing the driving signal from only the other side can be avoided, and strength of the driving signal can be improved.

In some embodiments, the M3 touch driving electrodes Tx are reused as common electrodes. Accordingly, at least one row or column of pixel cells are covered in a width direction by every strip of touch driving electrode Tx.

In the present disclosure, compared to related art where a gate driving circuit and a touch driving circuit are provided individually and a strobe signal is supplied to a touch selective output module by providing a scanning module in the touch driving circuit, the secondary trigger output signal of a respective group of shift register in the gate driving circuit is used as the strobe signal of the touch selective output module. Accordingly, the number of scanning modules in the touch driving circuit can be reduced, design of the touch driving circuit is simplified, and it is easier to implement design of a touch display device with a slim bezel. In addition, the number of input terminals can be reduced and cost of IC can be lowered.

Figure 3:
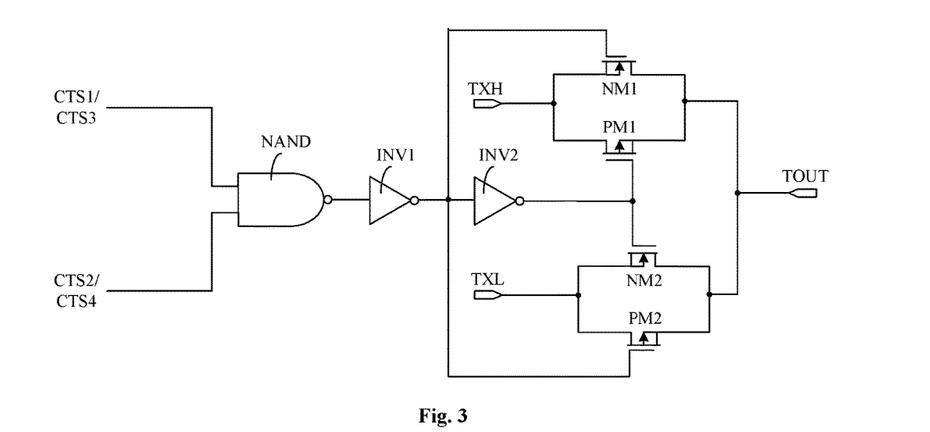
FIG. 3 is a schematic circuit diagram illustrating a touch selective output module according to an embodiment of the disclosure.

FIG. 3 is a schematic circuit diagram illustrating a touch selective output module according to an embodiment of the disclosure. In one embodiment, circuit structure of the first touch selective output module Us1 is the same as that of the second touch selective output module Us2 and, as shown in FIG. 3. That embodiment includes an NAND gate (denoted as NAND), a first phase inverter INV1, a second phase inverter INV2, a first NMOS transistor NM1, a first PMOS transistor PM1, a second NMOS transistor NM2, a second PMOS transistor PM2, a first signal input terminal TXH, a second signal input terminal TXL and a signal output terminal TOUT.

In another embodiment, two input terminals of the NAND gate are respectively configured to receive the first strobe signal and the second strobe signal. In the first touch selective output module Us1. A first input terminal and a second input terminal of the NAND gate are respectively coupled to the first strobe signal input terminal CTS1 and the second strobe signal input terminal CTS2 and are respectively configured to receive the first strobe signal and the second strobe signal. In the second touch selective output module Us2, a first input terminal and a second input terminal of the NAND gate are respectively coupled to the third strobe signal input terminal CTS3 and the fourth strobe signal input terminal CTS4 and are respectively configured to receive the first strobe signal and the second strobe signal.

In still another embodiment, a secondary trigger signal output from a secondary trigger signal output terminal of a shift register Rs in the first gate driving circuit 1310 coupled to the first strobe signal input terminal CTS1 is used as the first strobe signal by the first strobe signal input terminal CTS1; and a secondary trigger signal output from a secondary trigger signal output terminal of a shift register Rs in the third gate driving circuit 1330 coupled to the second strobe signal input terminal CTS2 is used as the second strobe signal by the second strobe signal input terminal CTS2. Otherwise, a secondary trigger signal output from a secondary trigger signal output terminal of a shift register Rs in the second gate driving circuit 1320 coupled to the third strobe signal input terminal CTS3 is used as the first strobe signal by the third strobe signal input terminal CTS3; and a secondary trigger signal output from a secondary trigger signal output terminal of a shift register Rs in the fourth gate driving circuit 1340 coupled to the fourth strobe signal input terminal CTS4 is used as the second strobe signal by the fourth strobe signal input terminal CTS4.

In an embodiment, an input terminal of the first phase inverter INV1 is coupled to an output terminal of the NAND gate. An input terminal of the second phase inverter INV2 is coupled to an output terminal of the first phase inverter INV1. A gate electrode of the first NMOS transistor NM1 is coupled to the input terminal of the second phase inverter INV2. A gate electrode of the first PMOS transistor PM1 is coupled to an output terminal of the second phase inverter INV2, a source electrode thereof is coupled to a drain electrode of the first NMOS transistor NM1, and a drain electrode thereof is coupled to a source electrode of the first NMOS transistor NM1. A gate electrode of the second NMOS transistor NM2 is coupled to the output terminal of the second phase inverter INV2. A gate electrode of the second PMOS transistor PM2 is coupled to the input terminal of the second phase inverter INV2, a source electrode thereof is coupled to a drain electrode of the second NMOS transistor NM2, and a drain electrode thereof is coupled to a source electrode of the second NMOS transistor NM2. The first signal input terminal TXH is coupled to the source electrode of the first NMOS transistor NM1 and configured to receive a first signal; the second signal input terminal TXL is coupled to the source electrode of the second NMOS transistor NM2 and configured to receive a second signal; the drain electrode of the first NMOS transistor NM1 is coupled to the drain electrode of the second NMOS transistor NM2 and then coupled to the signal output terminal TOUT; the signal output terminal TOUT is configured to output the first signal or the second signal.

Table 1 illustrates a truth table of the touch selective output module shown in FIG. 3. Herein, SCTS1 is indicative of the first strobe signal received by the first strobe signal input terminal CTS1 or the third signal strobe signal input terminal CTS3, SCTS2 is indicative of the second strobe signal received by the second strobe signal input terminal CTS2 or the fourth signal strobe signal input terminal CTS4; STXH is indicative of the first signal received by the first signal input terminal TXH; STXHL is indicative of the second signal received by the second signal input terminal TXL; and SOUT is indicative of the touch driving signal output by the signal output terminal TOUT.

TABLE 1

| SCTS1 | SCTS2 | SOUT |
|---|---|---|
| High level | High level | STXH |
| High level | Low level | STXH |
| Low level | High level | STXH |
| Low level | Low level | STXL |

As shown in Table 1, STXL is output by SOUT only when both SCTS1 and SCTS2 are at a low level, and STXH is output by SOUT otherwise.

Figure 4:
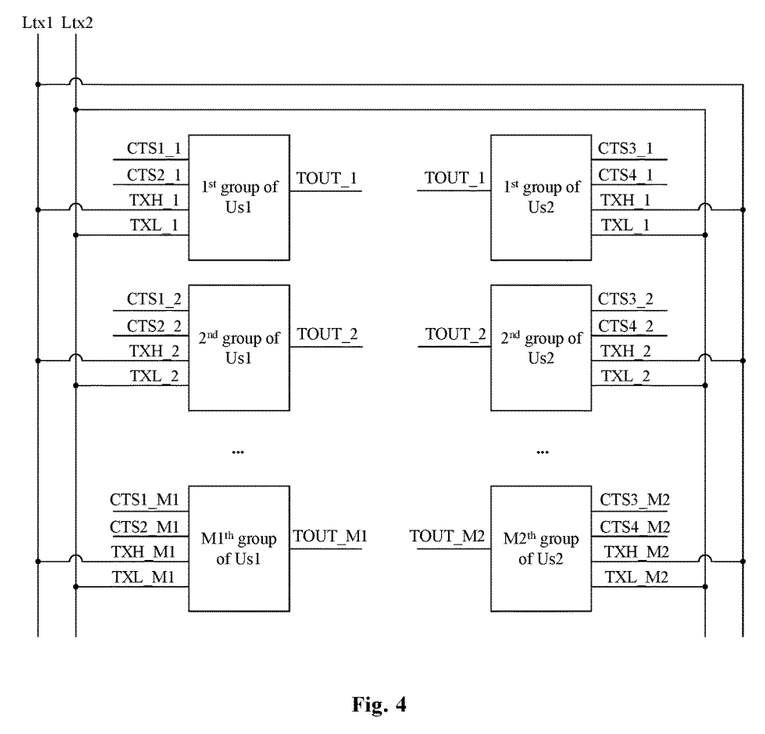
FIG. 4 is a schematic circuit diagram illustrating a touch driving circuit according to an embodiment of the disclosure.

FIG. 4 is a schematic circuit diagram illustrating a touch driving circuit according to an embodiment of the disclosure. As shown in FIG. 4, the touch driving circuit 140 further includes a first signal line Ltx1 and a second signal line Ltx2 respectively configured to provide the first signal and the second signal. The first signal input terminals TXH_1-TXH_M1 in every group of first touch selective output module Us1 and the first signal input terminal TXH_1-TXH_M2 in every group of second touch selective output module Us2 are respectively coupled to the first signal line Ltx1; and the second signal input terminal TXL_1-TXL_M1 in every group of first touch selective output module Us1 and the second signal input terminal TXL_1-TXL_M2 in every group of second touch selective output module Us2 are respectively coupled to the second signal line Ltx2.

Furthermore, when the M3 touch driving electrodes Tx are reused as common electrodes, the second signal provided by the second signal line TXL is a common voltage signal VCOM.

Figure 5:
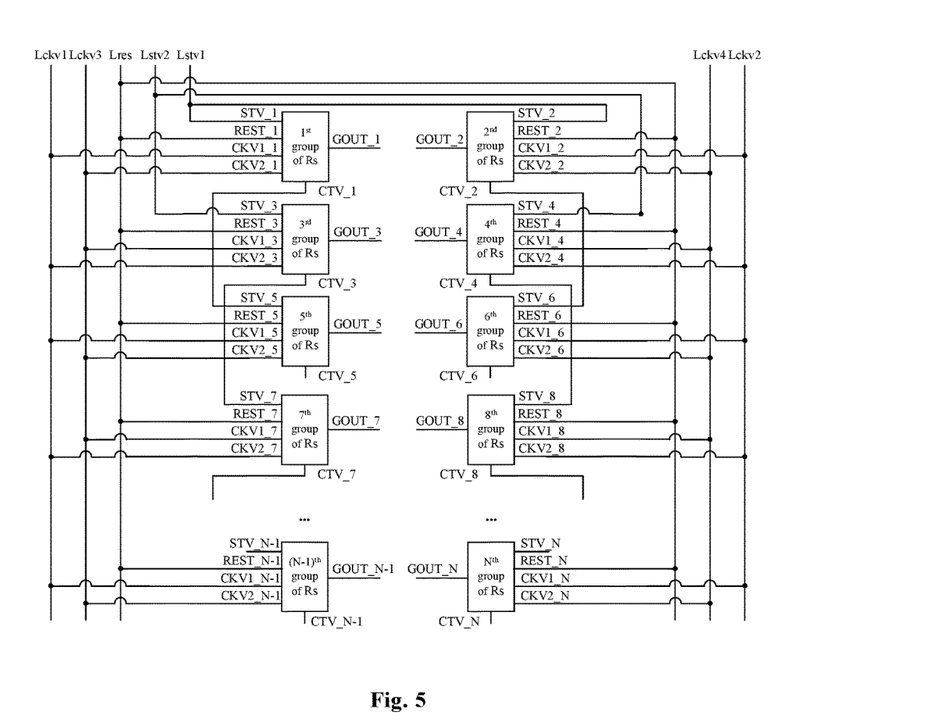
FIG. 5 is a schematic circuit diagram illustrating a gate driving circuit according to an embodiment of the disclosure.

FIG. 5 is a schematic circuit diagram illustrating a gate driving circuit according to an embodiment of the disclosure. As shown in FIG. 5, the gate driving circuit 130 further includes a first trigger signal line Lstv1, a second trigger signal line Lstv2, a first clock signal line Lckv1, a second clock signal line Lckv2, a third clock signal line Lckv3, a fourth clock signal line Lckv4, and a reset signal line Lres. In an embodiment, reset signal input terminals RES of every group of shift register Rs in the gate driving circuit 130 are coupled to the reset signal line Lres.

Respective first group of shift register Rs in the first gate driving circuit 1310 and in the second gate driving circuit 1320 (e.g. the 1$^{st}$ group of Rs and the 2$^{nd}$ group of Rs in FIG. 5) each has a trigger signal input terminal STV coupled to the first trigger signal line Lstv1; and respective first group of shift register Rs in the third gate driving circuit 1330 and in the fourth gate driving circuit 1340 (e.g. the 3$^{rd}$ group of Rs and the 4$^{th}$ group of Rs in FIG. 5) each has a trigger signal input terminal STV coupled to the second trigger signal line Lstv2.

In an embodiment, shift registers Rs in the first gate driving circuit 1310, the second gate driving circuit 1320, the third gate driving circuit 1330 and the fourth gate driving circuit 1340 are numbered in sequence. As shown in FIG. 5, for example, the 1$^{st}$ group of Rs in the first gate driving circuit 1310 is numbered as 1, the 5$^{th}$ group of Rs is numbered as 2, the 9$^{th}$ group of Rs (not shown) is numbered as 3, the 13$^{th}$ group of Rs (not shown) is numbered as 4, and so on; the 2$^{nd}$ group of Rs in the second gate driving circuit 1320 is numbered as 1, the 6$^{th}$ group of Rs is numbered as 2, the 10$^{th}$ group of Rs (not shown) is numbered as 3, the 14$^{th}$ group of Rs (not shown) is numbered as 4, and so on; the 3$^{rd}$ group of Rs in the third gate driving circuit 1330 is numbered as 1, the 7$^{th}$ group of Rs is numbered as 2, the 11$^{th}$ group of Rs (not shown) is numbered as 3, the 15$^{th}$ group of Rs (not shown) is numbered as 4, and so on; the 4$^{th}$ group of Rs in the fourth gate driving circuit 1340 is numbered as 1, the 8$^{th}$ group of Rs is numbered as 2, the 12$^{th}$ group of Rs (not shown) is numbered as 3, the 16$^{th}$ group of Rs (not shown) is numbered as 4, and so on.

The first clock signal input terminal CKV1 and the second clock signal input terminal CKV2 of shift registers Rs numbered as odd numbers in the first gate driving circuit 1310 and the third gate driving circuit 1330 (e.g. the 1$^{st}$ group of Rs and the 3$^{rd}$ group of Rs in FIG. 5) are respectively coupled to the first clock signal line Lckv1 and the third clock signal line Lckv3, while the first clock signal input terminal CKV1 and the second clock signal input terminal CKV2 of shift registers Rs numbered as even numbers (e.g. the 5$^{th}$ group of Rs and the 7$^{th}$ group of Rs in FIG. 5) are respectively coupled to the third clock signal line Lckv3 and the first clock signal line Lckv1.

The first clock signal input terminal CKV1 and the second clock signal input terminal CKV2 of shift registers Rs numbered as odd numbers in the second gate driving circuit 1320 and the fourth gate driving circuit 1340 (e.g. the 2$^{nd}$ group of Rs and the 4$^{th}$ group of Rs in FIG. 5) are respectively coupled to the second clock signal line Lckv2 and the fourth clock signal line Lckv4, while the first clock signal input terminal CKV1 and the second clock signal input terminal CKV2 of shift registers Rs numbered as even numbers (e.g. the 6$^{th}$ group of Rs and the 8$^{th}$ group of Rs in FIG. 5) are respectively coupled to the fourth clock signal line Lckv4 and the second clock signal line Lckv2.

Furthermore, scanning signal output terminals GOUT1-GOUTN of respective groups of shift registers are respectively coupled to the N rows of scanning lines Ls so as to provide the scanning driving signals.

In view of above description, operation principle of the gate driving circuit and the shift registers therein in FIG. 5 are well known by those skilled in the art and thus may not be elaborated herein to avoid obscuring the present disclosure. However, connection relationship and operation principle of the touch driving circuit 140 and the gate driving circuit 130 after being coupled to each other will be described as follow.

Figure 6:
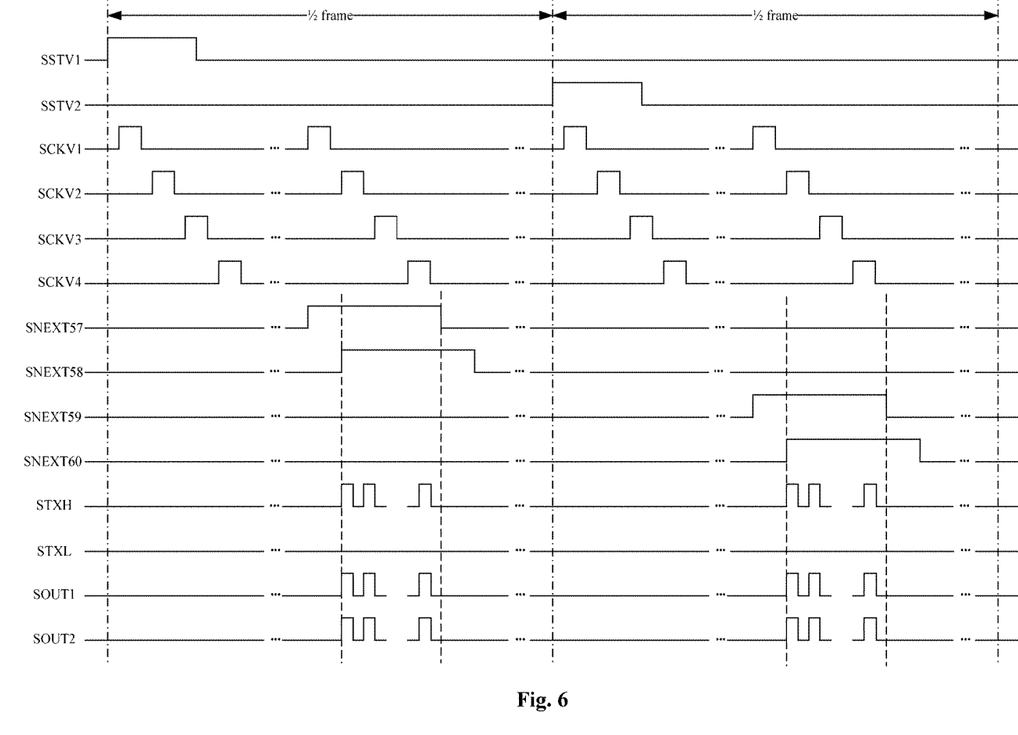
FIG. 6 is a time sequence chart illustrating respective input signal and output signal in the gate driving circuit and the touch driving circuit of the array substrate according to an embodiment of the disclosure.

FIG. 6 is a time sequence chart illustrating respective input signal and output signal in the gate driving circuit and the touch driving circuit of the array substrate according to an embodiment of the disclosure. Referring to FIGS. 4, 5 and 6, the first strobe signal input terminal CTS1_1 of the 1$^{st}$ group of first touch selective output module Us1 in the touch driving circuit shown by FIG. 4 may be coupled to the secondary trigger signal output terminal CTS_57 of the 57$^{th}$ group of shift register Rs in the gate driving circuit shown by FIG. 5. The second strobe signal input terminal CTS2_1 thereof may be coupled to the secondary trigger signal output terminal CTS_59 (not shown) of the 59$^{th}$ group of shift register Rs in the gate driving circuit shown by FIG. 5. The third strobe signal input terminal CTS3_1 of the 1$^{st}$ group of second touch selective output module Us2 in the touch driving circuit shown by FIG. 4 may be coupled to the secondary trigger signal output terminal CTS_58 (not shown) of the 58$^{th}$ group of shift register Rs in the gate driving circuit shown by FIG. 5, and the fourth strobe signal input terminal CTS4_1 thereof may be coupled to the secondary trigger signal output terminal CTS_60 (not shown) of the 60$^{th}$ group of shift register Rs in the gate driving circuit shown by FIG. 5. Remaining connection can be implemented with reference to the above description and will not be elaborated herein. Time sequence in FIG. 6 will be described as follows taking the above connection as an example.

As shown in FIG. 6, SSTV1 is indicative of a signal provided by the trigger signal line Lstv1 in the gate driving circuit 130. SSTV2 is indicative of a signal provided by the trigger signal line Lstv2 in the gate driving circuit 130. CCKV1 is indicative of a signal provided by the first clock signal line Lckv1 in the gate driving circuit 130. CCKV2 is indicative of a signal provided by the second clock signal line Lckv2 in the gate driving circuit 130. CCKV3 is indicative of a signal provided by the third clock signal line Lckv3 in the gate driving circuit 130. CCKV4 is indicative of a signal provided by the fourth clock signal line Lckv4 in the gate driving circuit 130. SNEXT57 is indicative of a signal provided by the secondary trigger signal output terminal of the $57^{th}$ group of shift register Rs; SNEXT58 is indicative of a signal provided by the secondary trigger signal output terminal of the $58^{th}$ group of shift register Rs. SNEXT59 is indicative of a signal provided by the secondary trigger signal output terminal of the $59^{th}$ group of shift register Rs. SNEXT60 is indicative of a signal provided by the secondary trigger signal output terminal of the $60^{th}$ group of shift register Rs. STXH is indicative of the first signal provided by the first signal line Ltx1, that is, the multiple pulse signals when being strobed as shown in the drawing; STXL is indicative of the second signal provided by the second signal line Ltx2, and clock of the second signal is at a low level; SOUT1 is indicative of an output signal from the first group of first touch selective output module Us1. SOUT2 is indicative of an output signal from the first group of second touch selective output module Us2.

Further referring to FIGS. 4-6, in the first ½ frame. That is, in the former half frame, only SSTV1 has an initial signal of a high level, scanning is performed in an alternative way by respective group of shift register Rs in the first gate driving circuit 1310. The second gate driving circuit 1320, and every group of first touch selective output module Us1 enables a high level by means of the signal output from the secondary trigger signal output terminal of a corresponding shift register Rs in the first gate driving circuit 1310 such that a STXH signal is output at a corresponding position. At the same time, every group of second touch selective output module Us2 enables a high level by means of the signal output from the secondary trigger signal output terminal of a corresponding shift register Rs in the second gate driving circuit 1320 such that a STXH signal is output at a corresponding position. As shown in FIG. 6, for example, SNEXT57 and SNEXT58 are at high levels, STXH is output by both SOUT1 and SOUT2, such that scanning of all of the touch driving electrodes is completed for once.

In the second ½ frame, that is, in the later half frame, only SSTV2 has an initial signal of a high level, scanning is performed in an alternative way by respective group of shift register Rs in the third gate driving circuit 1330 and the fourth gate driving circuit 1340. Every group of first touch selective output module Us1 enables a high level by means of the signal output from the secondary trigger signal output terminal of a corresponding shift register Rs in the third gate driving circuit 1330 such that a STXH signal is output at a corresponding position. At the same time, every group of second touch selective output module Us2 enables a high level by means of the signal output from the secondary trigger signal output terminal of a corresponding shift register Rs in the fourth gate driving circuit 1340 such that a STXH signal is output at a corresponding position. As shown in FIG. 6, for example, SNEXT59 and SNEXT60 are at high levels, STXH is output by both SOUT1 and SOUT2, such that scanning of all of the touch driving electrodes is completed for once.

In this way, the scanning of all of the touch driving electrodes is completed once for each half frame and thus twice for one frame. Accordingly, it can be achieved a scanning frequency twice the frame rate, so the report rate of touch can be improved. Furthermore, in every half frame, driving signals can be provided for a single strip of touch driving electrode from both sides by two touch selective output modules at the same time. Accordingly, attenuation of the driving signal at one side caused by providing the driving signal from only the other side can be avoided, and the strength of the driving signal can be improved.

Figure 7A:
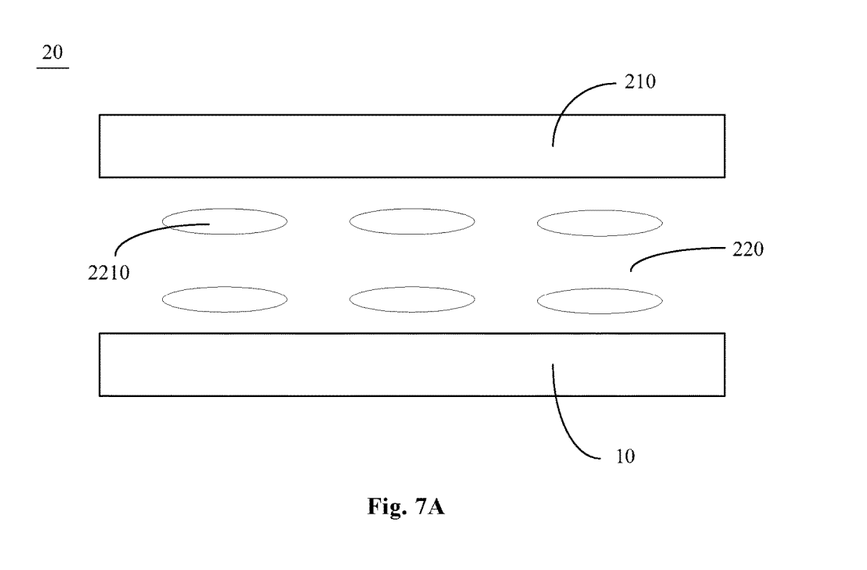
FIG. 7A is a block diagram illustrating a touch display device according to an embodiment of the disclosure.

FIG. 7A is a block diagram illustrating a touch display device according to an embodiment of the disclosure. As shown in FIG. 7A, the touch display device 20 includes the array substrate 10, a color filter 210 provided in opposite to the array substrate 10, and a liquid crystal layer 220 sandwiched between the array substrate 10 and the color filter 210. In an embodiment, the liquid crystal layer 220 has a plurality of liquid crystal molecules 2210 therein.

Figure 7B:
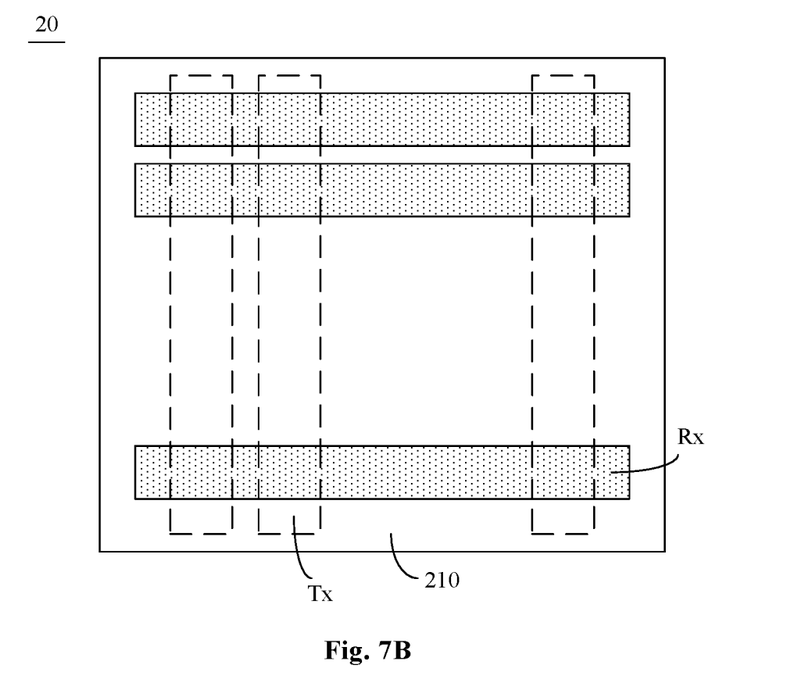
FIG. 7B is a top view of a touch display device according to an embodiment of the disclosure.

FIG. 7B is a top view of a touch display device according to an embodiment of the disclosure. As shown in FIG. 7B, the touch display device 20 also includes a plurality of touch sensing electrodes Rx provided at one side of the color filter 210 away from the liquid crystal layer 220. In an embodiment, the plurality of touch sensing electrodes Rx are arranged in intersection with the M3 touch driving electrodes. Alternatively, the plurality of touch sensing electrodes Rx can be located at any film layer of the color filter 210 or at any film layer of the array substrate 10, and the present disclosure is not limited thereto. Moreover, the touch sensing electrodes Rx and the touch driving electrodes Tx can be located in a same layer or in different layers, and the present disclosure is not limited thereto.

There is also provided a method for driving the touch display device according to the present disclosure. The touch display device includes: a plurality of first shift register sets, a plurality of second shift register sets, a plurality of third shift register sets, a plurality of fourth shift register sets, multiple groups of first touch selective output modules and multiple groups of second touch selective output modules. In an embodiment, every one of the first, second, third and fourth shift register sets respectively includes at least one group of shift register, every group of shift register in respective shift register set generates a scanning signal for scanning one row of scanning line and a secondary trigger signal for driving a following group of shift register in corresponding shift register set. Every shift register in the first and third shift register sets is configured to respectively provide a scanning signal to an odd-numbered row of scanning line, and respective groups of shift register in the first and third shift register sets are alternatively arranged at intervals. Every shift register in the second and fourth shift register sets is configured to respectively provide a scanning signal to an even-numbered row of scanning line, and respective groups of shift register in the second and fourth shift register sets are alternatively arranged at intervals. Every group of first touch selective output module includes a first strobe signal input terminal and a second strobe signal input terminal. The first strobe signal input terminal is coupled to a secondary trigger signal output terminal of one last shift register of a corresponding first shift register set, and the second strobe signal input terminal is coupled to a secondary trigger signal output terminal of one last shift register of a corresponding third shift register set. Every group of second touch selective output module includes a third strobe signal input terminal and a fourth strobe signal input terminal, the third strobe signal input terminal is coupled to a secondary trigger signal output terminal of one last shift register of a corresponding second shift register set, and the fourth strobe signal input terminal is coupled to a secondary trigger signal output terminal of one last shift register of a corresponding fourth shift register set. The driving method 30 includes the following steps.

In step S310, scanning lines are scanned in a staggered way by respective shift register in every one of the first shift register sets and respective shift register in every one of the second shift register sets, which are coupled to the scanning lines correspondingly, during a first half frame of display scanning.

In step S320, after completion of the scanning for correspondingly coupled scanning lines by the respective shift register in every one of the first and second shift register sets, the first touch selective output module and the second touch selective output module are driven with a secondary trigger signal respectively generated by a last one shift register in every one of the first shift register sets and a last one shift register in every one of the second shift register sets, which are coupled with the first and second touch selective output modules correspondingly, such that first touch driving signals are provided to one of the touch driving electrodes by the shift registers simultaneously.

In step S330, scanning lines are scanned in a staggered way by respective shift register in every one of the third shift register sets and respective shift register in every one of the fourth shift register sets, which are coupled to the scanning lines correspondingly, during a second half frame of the display scanning.

In step S340, after completion of the scanning for the correspondingly coupled scanning line by the respective shift register in every one of the third and fourth shift register sets, the first touch selective output module and the second touch selective output module are driven with a secondary trigger signal respectively generated by a last one shift register in every one of the third shift register sets and a last one shift register in every one of the fourth shift register sets, which are coupled with the first and second touch selective output modules correspondingly, such that second touch driving signals are provided to one of the touch driving electrodes by the shift registers simultaneously.

It should be noted that, both the first touch driving signal and the second touch driving signal that are valid represent multiple pulse signals provided by a single signal line.

According to the array substrate, the touch display device and the driving method thereof, a simplified touch driving circuit is provided, such that it is easy to achieve design of a slim bezel, and the number of signal input terminals as well as cost on ICs can be reduced. Furthermore, the scanning of all of the touch driving electrodes can be completed once for each half frame, such that it can be achieved a report frequency twice the frame rate. Moreover, touch signal can be provided for a single touch driving electrode from both sides by two groups of touch selective output modules at the same time, such that attenuation of the driving signal at one side caused by providing the driving signal from only the other side can be avoided, and strength of the driving signal can be improved.

The disclosure has been described by reference to the embodiments above which are merely examples for implementing the disclosure. It should be noted that the present disclosure is not limited to the exact embodiments that have been described above. Instead, various modifications and changes can be made without departing from concept and scope of the disclosure and should be covered by protection scope thereof.

What is claimed is:

1. An array substrate, comprising a display area and a non-display area located at least two opposite outer sides of the display area, wherein the array substrate further comprises:
    N rows of scanning lines provided in the display area, where N is an integer greater than 1;
    a gate driving circuit provided in the non-display area, comprising N groups of shift register, wherein each group of the shift register comprises a trigger signal input end and a secondary trigger signal output end; the gate driving circuit comprises a first gate driving circuit, a second gate driving circuit, a third gate driving circuit and a fourth gate driving circuit, wherein the first and third gate driving circuits are provided at one side of the non-display area and configured to respectively provide scanning signal to odd-numbered rows of the scanning lines, and respective groups of shift register in the first and third gate driving circuits are alternatively arranged at intervals; the second and fourth gate driving circuits are provided at another opposite side of the non-display area and configured to respectively provide scanning signal to even-numbered rows of the scanning lines, and respective groups of shift register in the second and fourth gate driving circuits are alternatively arranged at intervals; every shift register in one of the first, second, third and fourth gate driving circuit is coupled in series with another shift register in the one of the first, second, third and fourth gate driving circuit, and the trigger signal input end of a following group of shift register is coupled with the secondary trigger signal output end of a preceding group of shift register; and
    a touch driving circuit provided in the non-display area, comprising a first touch driving circuit and a second touch driving circuit; wherein the first touch driving circuit comprises M1 groups of first touch selective output module, each group of the first touch selective output module comprises a first strobe signal input end and a second strobe signal input end; and the second touch driving circuit comprises M2 groups of second touch selective output module, each group of the second touch selective output module comprises a third strobe signal input end and a fourth strobe signal input end, where both M1 and M2 are integers greater than 1; the first and second strobe signal input ends in respective group of the first touch selective output module are respectively coupled with the secondary trigger signal output ends of two adjacent shift registers in the first and third gate driving circuits correspondingly, and the third and fourth strobe signal input ends in respective group of the second touch selective output module are respectively coupled with the secondary trigger signal output ends of two adjacent shift registers in the second and fourth gate driving circuits correspondingly.

2. The array substrate as claimed in claim 1, further comprising M3 strips of touch driving electrodes provided in the display area, where M3 is an integer greater than 1 and wherein one strip of the touch driving electrode is respectively coupled with one group of the first touch selective output module and/or the second touch selective output module.

3. The array substrate as claimed in claim 2, wherein, when M1 is greater than M2, M3 is equal to M1 and only M3-M2 strips of the touch driving electrodes are coupled with M1-M2 groups of the first touch selective output module; when M1 is smaller than M2, M3 is equal to M2 and only M3 M1 strips of the touch driving electrodes are coupled with M2 M1 groups of the second touch selective output module.

4. The array substrate as claimed in claim 2, where in M1, M2, and M3 are equal to each other.

5. The array substrate as claimed in claim 2, wherein the M3 strips of touch driving electrodes are used as a common electrode.

6. The array substrate as claimed in claim 1, wherein the first and third gate driving circuit respectively comprises M1 shift register sets, the second and fourth gate driving circuit respectively comprises M2 shift register sets, and each one of the shift register sets comprises at least one group of shift register;
the first strobe signal input end in every group of the first touch selective output module is coupled with the secondary trigger signal output end of a last one shift register of a corresponding shift register set in the first gate driving circuit, and the second strobe signal input end in every group of the first touch selective output module is coupled with the secondary trigger signal output end of a last one shift register of a corresponding shift register set in the third gate driving circuit;
the first strobe signal input end in every group of the second touch selective output module is coupled with the secondary trigger signal output end of a last one shift register of a corresponding shift register set in the second gate driving circuit, and the second strobe signal input end in every group of the second touch selective output module is coupled with the secondary trigger signal output end of a last one shift register of a corresponding shift register set in the fourth gate driving circuit.

7. The array substrate as claimed in claim 1, every group of the first touch selective output module and every group of the second touch selective output module respectively comprises:
an NAND gate having a first input end and a second input end respectively coupled with the first strobe signal input end and the second strobe signal input end or respectively couples with the third strobe signal input end and the fourth strobe signal input end;
a first phase inverter having an input end coupled with an output end of the NAND gate;
a second phase inverter having an input end coupled with an output end of the first phase inverter;
a first NMOS transistor having a gate electrode coupled with the input end of the second phase inverter;
a first PMOS transistor having a gate electrode coupled with an output end of the second phase inverter, a source electrode coupled with a drain electrode of the first NMOS transistor, and a drain electrode coupled with a source electrode of the first NMOS transistor;
a second NMOS transistor having a gate electrode coupled with the output end of the second phase inverter;
a second PMOS transistor having a gate electrode coupled with the input end of the second phase inverter, a source electrode coupled with a drain electrode of the second NMOS transistor, and a drain electrode coupled with a source electrode of the second NMOS transistor;
a first signal input end coupled with the source electrode of the first NMOS transistor and configured to receive a first signal;
a second signal input end coupled with the source electrode of the second NMOS transistor and configured to receive a second signal; and
a signal output end configured to output the first signal or the second signal;
wherein the drain electrode of the first NMOS transistor is coupled with the drain electrode of the second NMOS transistor and then coupled with the signal output end.

8. The array substrate as claimed in claim 7, wherein the touch driving circuit further comprises a first signal line and a second signal line; the first signal input end in every group of the first touch selective output module and the first signal input end in every group of the second touch selective output module are respectively coupled with the first signal line, and the second signal input end in every group of the first touch selective output module and the second signal input end in every group of the second touch selective output module are respectively coupled with the second signal line.

9. The array substrate as claimed in claim 1, wherein the gate driving circuit further comprises a first trigger signal line and a second trigger signal line; the trigger signal input end of a foremost group of the shift register in the first and second gate driving circuits are respectively coupled with the first trigger signal line, and the trigger signal input end of a foremost group of the shift register in the third and fourth gate driving circuits are respectively coupled with the second trigger signal line.

10. The array substrate as claimed in claim 9, wherein the gate driving circuit further comprises a first clock signal line, a second clock signal line, a third clock signal line, and a fourth clock signal line; the first clock signal line and the third clock signal line are commonly used by every group of the shift register in the first and third gate driving circuits, and the second clock signal line and the fourth clock signal line are commonly used by every group of the shift register in the second and fourth gate driving circuits.

11. A touch display device, comprising:
the array substrate according to claim 1;
a color filter provided in opposition to the array substrate; and
a liquid crystal layer sandwiched between the array substrate and the color filter.

12. The touch display device as claimed in claim 11, further comprising: a plurality of touch sensing electrodes provided at one side of the color filter away from the liquid crystal layer, wherein the plurality of touch sensing electrodes are arranged in intersection with the M3 strips of touch driving electrodes.

13. A method for driving a touch display device, wherein the touch display device comprises: a plurality of first shift register sets, a plurality of second shift register sets, a plurality of third shift register sets, a plurality of fourth shift register sets, multiple groups of a first touch selective output module and multiple groups of a second touch selective output module; every one of the first, second, third and fourth shift register sets respectively comprises at least one group of shift register, every group of shift register in respective shift register set generates a scanning signal for scanning one row of scanning line and a secondary trigger signal for driving a following group of shift register in corresponding shift register set; every shift register in the first and third shift register sets is configured to respectively provide scanning signal to an odd-numbered row of scanning line, and respective groups of shift register in the first and third shift register sets are alternatively arranged at intervals; every shift register in the second and fourth shift register sets is configured to respectively provide scanning signal to an even-numbered row of scanning line, and respective groups of shift register in the second and fourth shift register sets are alternatively arranged at intervals; every group of the first touch selective output module comprises a first strobe signal input end and a second strobe signal input end, the first strobe signal input end is coupled with a secondary trigger signal output end of a last one shift register of a corresponding first shift register set, and the second strobe signal input end is coupled with a secondary trigger signal output end of a last one shift register of a corresponding third shift register set; every group of the second touch selective output module comprises a third strobe signal input end and a fourth strobe signal input end, the third strobe signal input end is coupled with a secondary trigger signal output end of a last one shift register of a corresponding second shift register set, and the fourth strobe signal input end is coupled with a secondary trigger signal output end of a last one shift register of a corresponding fourth shift register set; the method comprises:

scanning, by respective shift register in every one of the first shift register sets and respective shift register in every one of the second shift register sets, a correspondingly coupled scanning line in a staggered way during a first half frame of display scanning;

driving, with a secondary trigger signal respectively generated by a last one shift register in every one of the first shift register sets and a last one shift register in every one of the second shift register sets, the first touch selective output module and the second touch selective output module after completion of the scanning for the correspondingly coupled scanning line by the respective shift register in every one of the first and second shift register sets, such that a first touch driving signal is provided to one of the touch driving electrodes simultaneously;

scanning, by respective shift register in every one of the third shift register sets and respective shift register in every one of the fourth shift register sets, a correspondingly coupled scanning line in a staggered way during a second half frame of the display scanning;

driving, with a secondary trigger signal respectively generated by a last one shift register in every one of the third shift register sets and a last one shift register in every one of the fourth shift register sets, the first touch selective output module and the second touch selective output module after completion of the scanning for the correspondingly coupled scanning line by the respective shift register in every one of the third and fourth shift register sets, such that a second touch driving signal is provided to one of the touch driving electrodes simultaneously.

\* \* \* \* \*